United States Patent [19]

Sakamoto

[11] Patent Number: 4,509,235
[45] Date of Patent: Apr. 9, 1985

[54] TOOL CHANGER

[75] Inventor: Shinichiro Sakamoto, Kariya, Japan

[73] Assignee: Toyoda Koki Kabushiki Kaisha, Kariya, Japan

[21] Appl. No.: 405,085

[22] Filed: Aug. 4, 1982

[30] Foreign Application Priority Data

Sep. 9, 1981 [JP] Japan .................. 56-141094

[51] Int. Cl.³ .......................... B23Q 3/157
[52] U.S. Cl. ........................ 29/26 A; 29/568
[58] Field of Search .......... 408/35; 29/568, 26 A; 279/1 TS; 409/232

[56] References Cited

U.S. PATENT DOCUMENTS

| | | | |
|---|---|---|---|
| 3,188,736 | 6/1965 | Brainard et al. | 29/568 |
| 3,930,301 | 1/1976 | Wagner | 29/568 |
| 4,108,564 | 8/1978 | Peddinghaus et al. | 408/10 |
| 4,338,709 | 7/1982 | Straub et al. | 29/568 |
| 4,354,306 | 10/1982 | Ida et al. | 29/568 |
| 4,404,727 | 9/1983 | Zankl | 29/568 |

FOREIGN PATENT DOCUMENTS 50-8231 4/1975 Japan .

Primary Examiner—William R. Briggs
Attorney, Agent, or Firm—Oblon, Fisher, Spivak, McClelland & Maier

[57] ABSTRACT

A tool changer for use in a transfer machine includes a pallet movable to a station in front of a machining unit, and a tool support mounted on the pallet for releasably supporting a tool. The machining unit is movable by an actuator toward the tool support to receive the tool from or release the tool onto the tool support. When the machining unit is advanced toward the tool support, the pallet is lowered by another actuator to release the tool support from supporting the tool, which has been held by the machining unit. Prior to transfer of the tool from the tool support to the machining unit, the tool is held down against the tool support by a clamp arm pivotably mounted on a clamp frame fixedly placed on the pallet. The clamp arm is angularly actuatable to release the tool in response to the movement of the machining unit toward the tool support.

8 Claims, 5 Drawing Figures

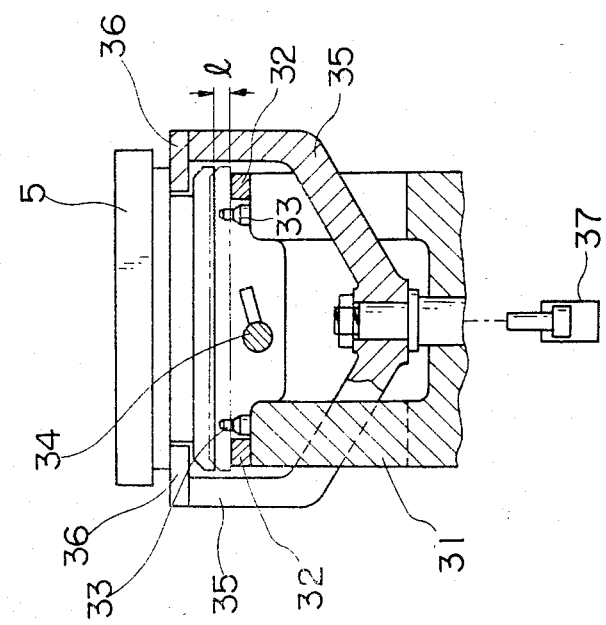
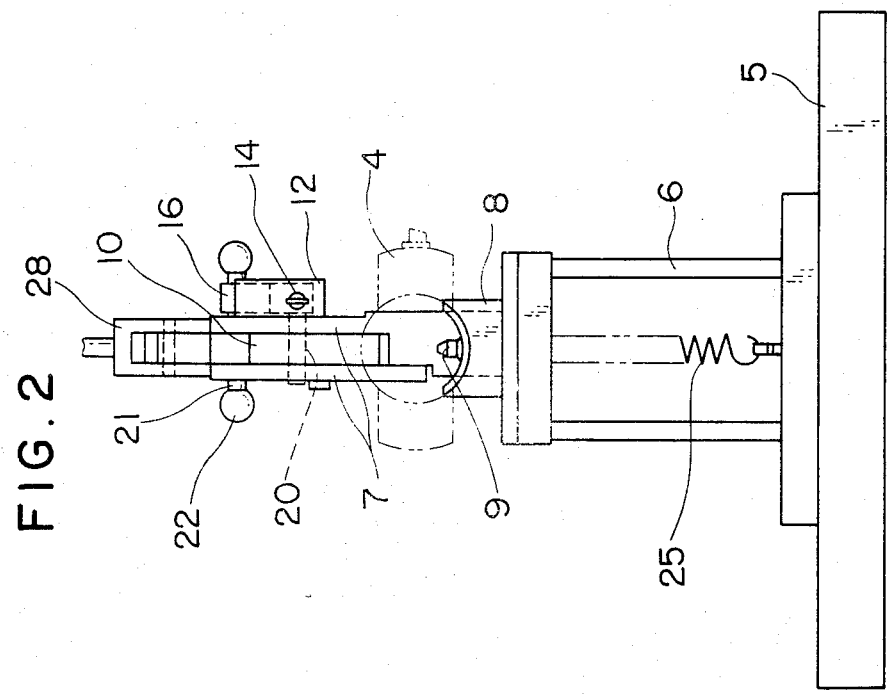

TOOL CHANGER

BACKGROUND OF THE INVENTION

The present invention relates to a tool changer for changing tools on a machining unit.

As is well known in the art, numerically controlled transfer machines are required to perform a change of tools when different workpieces are to be machined or a worn tool is to be replaced with a new one. Such tool change can be effected by transferring a new tool to a machining station including a machining unit by means of a transfer device in the same manner as that in which a workpiece is transferred. At the machining station, the tool which was previously used is manually replaced with the new tool. Manual tool changing has been unavoidable since most of machining units, such as a boring unit, in the transfer machine are movable along only one control axis, that is, in the axial direction of a tool spindle of the unit, and a tool positioned and held on a pallet cannot be changed simply by utilizing back-and-forth movement of the machining unit in the axial direction.

SUMMARY OF THE INVENTION

It is an object of the present invention to provide a tool changer for automatically changing tools by utilizing both back-and-forth movement of a machining unit and up-and-down movement of a pallet in machine tools such as transfer machines wherein pallets are vertically movable at a machining station for being clamped and unclamped thereat.

Another object of the present invention is to provide a tool changer for transfer machines which is capable of automatically clamping and unclamping a tool on and from a pallet, so that improved tool change efficiency and labor savings can be realized.

According to the present invention, a tool changer includes a pallet movable to a station in front of a machining unit having a tool spindle for removably clamping a tool, and a tool support mounted on the pallet for releasably supporting the tool in substantial alignment with the tool spindle of the machining unit. The machining unit is movable by a feed actuator toward and away from the tool support in the axial direction of the tool spindle to receive the tool from or release the tool onto the tool support. The pallet is movable by a feed device in a direction transverse to the axial direction of the tool spindle to cause the tool support to disengage from or receive the tool when the machining unit completes its displacement toward the tool support. A tool clamp is mounted on the pallet for releasably clamping the tool on the tool support and is responsive to the movement of the machining unit toward the tool support for releasing the tool from clamping on the tool support.

BRIEF DESCRIPTION OF THE DRAWINGS

The above and other objects, features and attendant advantages of the present invention will become more apparent from the following description of a preferred embodiment when considered in conjunction with the accompanying drawings, wherein like reference numerals designate the same or corresponding parts throughout the several views, in which:

FIG. 2 is a front elevational view taken from the direction indicated by the arrow II of FIG. 1;

FIG. 5 is a fragmentary cross-sectional view of a pallet lifting and lowering device.

DETAILED DESCRIPTION OF THE PREFERRED EMBODIMENT

Figure 1:
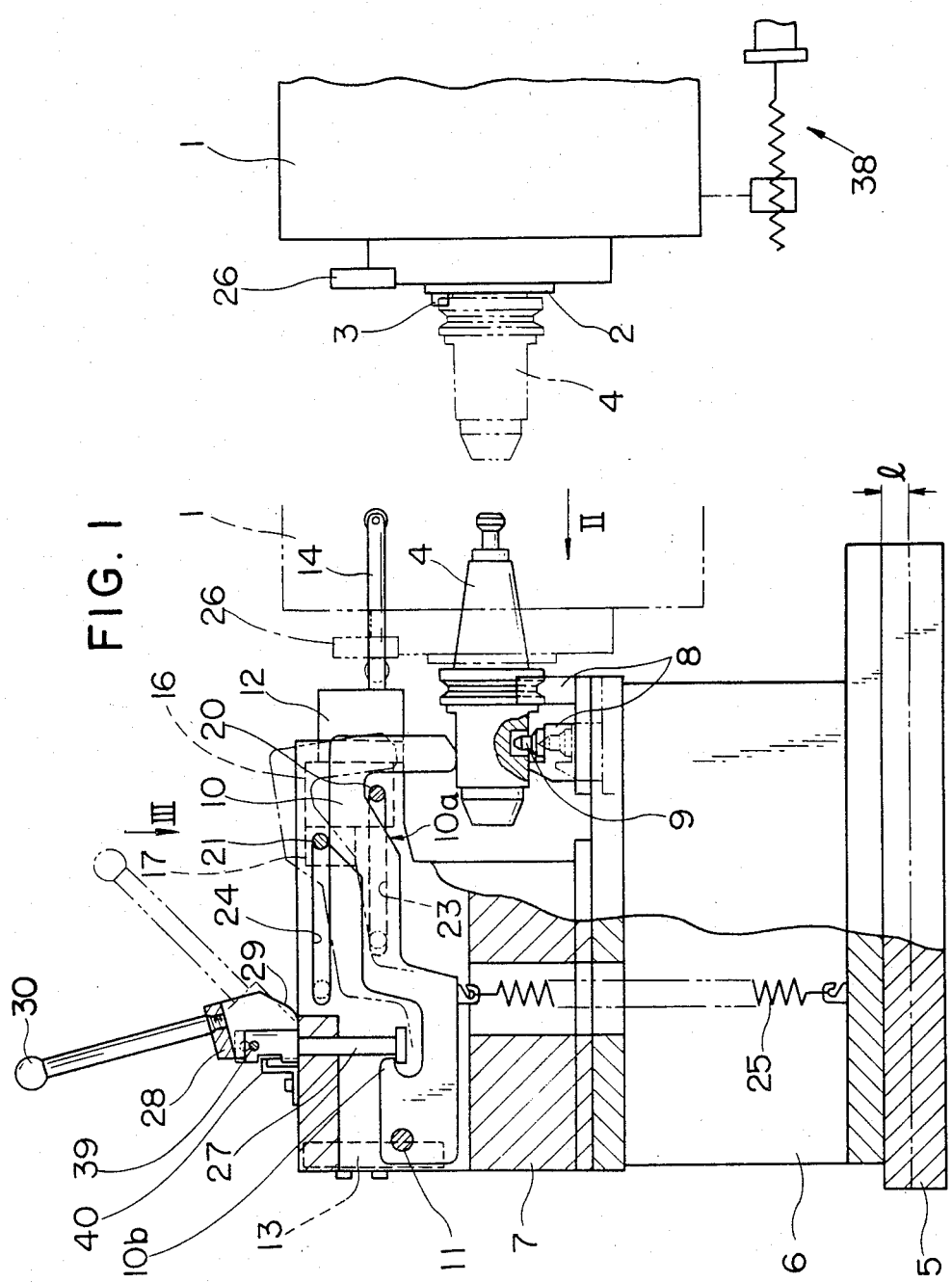
FIG. 1 is a side elevational view, partly in cross section, of a tool changer according to the present invention.

As shown in FIG. 1, a boring unit 1 (hereinafter referred to as a "unit") is located in a machining station in a transfer machine and has a tool spindle 2 for receiving therein a boring tool 4 (hereinafter referred to as a "tool"). The tool spindle 2 has therein a clamp (not shown) for removably clamping the tool 4 received in the tool spindle 2. The tool spindle 2 is stopped at a predetermined angular position to present a key 3 in alignment with a keyway, not shown, of the tool 4 and is locked thereat against rotation during tool change. The unit 1 is movable back and forth by an actuator 38 in the direction of the axis of the tool spindle 2 or the Z-axis. A control plate 26 is fixed to a front face of the unit 1 for movement therewith into abutting engagement with an actuation rod 14 to open and close a clamp arm 10 (later described) to unclamp and clamp the tool 4.

A pallet 5 supports thereon a means for positioning and holding the tool 4, a tool clamp mechanism, and a mechanism for actuating the tool clamp mechanism. As illustrated in FIGS. 1 and 2, a support base 6 is mounted on the pallet 5 and supports thereon a tool support 8 for supporting the tool 4 in substantial alignment with the axis of the tool spindle 2. The tool support 8 includes a positioning pin 9 for insertion into a positioning hole defined in a lower surface of the tool 4. The pallet 5 is movable upwardly and downwardly, as described hereinafter, through a predetermined distance 1 which is greater than the length of the positioning pin 9 that is insertable into the tool 4.

A clamp frame 7 is securely placed on the support base 6. A horizontally extending clamp arm 10 is vertically pivotably mounted by a pivot pin 11 on the clamp frame 7 for releasably holding the tool 4 down against the tool support 8. The clamp arm 10 is normally urged by a tension spring 25 to turn in a clockwise direction (FIG. 1) to clamp the tool 4 on the tool support 8. Thus the clamp arm 10 serves as the tool clamp mechanism.

Figure 3:
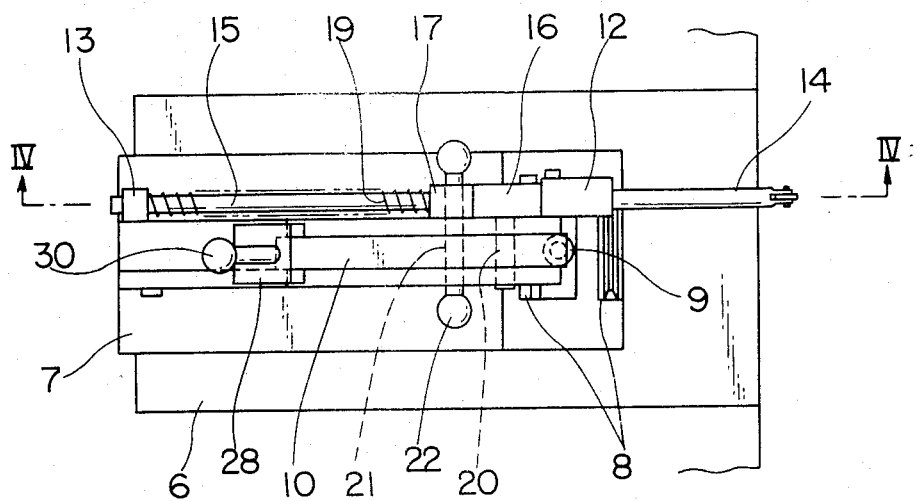
FIG. 3 is a plan view taken from the direction indicated by the arrow III of FIG. 1.
Figure 4:
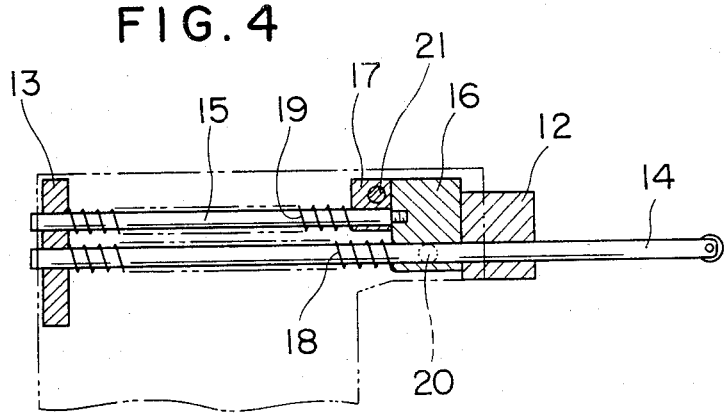
FIG. 4 is a cross-sectional view taken along the line IV—IV of FIG. 3.

The tool clamp mechanism can be actuated by the actuation mechanism which, as better shown in FIGS. 3 and 4, comprises a pair of guide brackets 12, 13 fixed to the clamp frame 7 at opposite ends thereof, respectively, and an actuation rod 14 axially slidably extending through the guide brackets 12, 13 in a direction parallel to the axis of the tool spindle 2 of the unit 1. The actuation rod 14 has a first slider 16 fixed thereto. A guide rod 15 is disposed over and extends parallel to the actuation rod 14, the guide rod 15 having one end slidably supported on the guide bracket 13 and the other end secured to the first slider 16. A second slider 17 is slidably supported on the guide rod 15. The first slider 16 and the actuation rod 14 are resiliently urged to the right (FIG. 4) by the force of a spring 18 disposed around the actuation rod 14 until the first slider 16 is held against the guide bracket 12. The section slider 17 is resiliently urged by a spring 19 coiled around the guide rod 15, into abutment against the first slider 16.

As better shown in FIG. 1, the first slider 16 has an actuation pin 20 extending transversely of the rod 14 and slidably engageable with a slanted lower cam surface 10a on the clamp arm 10. Similarly, the second slider 17 has a lock pin 21 extending transversely of the rod 15 and slidably engageable with an upper surface of the clamp arm 10. As illustrated in FIGS. 2 and 3, the lock pin 21 has on its opposite ends knobs 22, for manually moving the lock pin 21 to unlock the clamp arm 10, as described later on. The actuation pin 20 and the lock pin 21 are guided respectively in horizontal guide slots 23 and 24 defined in the clamp frame 7.

The clamp arm 10 can manually be operated by a manual actuation unit when the tool 4 is to be placed on the tool support 8 or to be removed therefrom. The manual actuation unit includes a vertical rod 27 vertically slidably mounted on the clamp frame 7 and having a lower end held in operative engagement with a hook 10b of the clamp arm 10. A cam body 28 is angularly movably mounted on the clamp frame 7 and pivotably coupled by a pin 39 to an upper end of the vertical rod 27. The cam body 28 has two differently inclined cam surfaces 29 engageable one at a time with the clamp frame 7 so that the cam body 28 will be stably held in two different angularly spaced positions. The cam body 28 is manually actuatable by a handle 30 fixed thereto. When the cam body 28 is angularly moved from the solid-line position (FIG. 1) in which one of the cam surfaces 29 is held in contact with clamp frame 7 to the broken-line position in which the other cam surface 29 engages the clamp frame 7, the vertical rod 27 is raised due to leverage to angularly lift the clamp arm 10 from the solid-line position to the broken-line position to thereby unclamp the tool 4. Rotational movement of the vertical rod 27 is prevented by a stop 40 secured to the clamp frame 7.

FIG. 7 shows a device for lifting and lowering the pallet 5 through the predetermined distance 1 in the machining station in front of the unit 1. The pallet 5 is transferred to the machining station along a transfer bar 34 in the transfer machine. A pair of clamping arms 35, 35 are vertically movably supported on a jig base 31 and can be actuated upwardly and downwardly by a fluid cylinder 37. The clamping arms 35, 35 support a pair of guide rails 36 and 36, respectively, which serve as clamps engageable with the pallet 5. The jig base 31, which is located under the pallet 5, has a pair of clamping reference faces 32, 32 and a pair of knock pins 33, 33 projecting upwardly adjacent to the reference faces 32 and 32, respectively, the knock pins 33, 33 being insertable into positioning holes (not illustrated) defined in a lower surface of the pallet 5. The device for lifting and lowering the pallet 5 has been known in the art for clamping and unclamping the pallet 5 with a workpiece mounted thereon at a machining station in the transfer machine.

Tool change operation of the tool changer thus constructed is as follows: The pallet 5 with the tool 4 clamped in position on the tool support 8 is transferred along the transfer bar 34 to the machining station in front of the unit 1 which is to be provided with the tool 4. The pallet 5 as thus transferred to the machining station is guided and supported on the guide rails 36 of the clamping arms 35 which have been raised. At this time, the tool 4 mounted on the tool support 8 is held in horizontal alignment with the tool spindle 2 of the unit 1.

Then, the unit 1 is advanced by the actuator 38 toward the tool support 8 as a tapered portion of the tool 4 is inserted into a tool insertion hole, not shown, of the tool spindle 2. On such advancing movement of the unit 1, the actuation rod 14 is pushed by the control plate 26 to retract the first and second sliders 16, 17 in unison. The lock pin 21 first disengages from the upper surface of the clamp arm 10 to unlock the same. Then, the actuation pin 20 is brought into sliding engagement with the slanted cam surface 10a to lift the clamp arm 10 for thereby unclamping the tool 4.

When the unit 1 is moved forward a predetermined distance and stopped, the tool 4 is received and clamped in the tool spindle 2 by the clamp therein. Subsequently, the fluid cylinder 37 is actuated to lower the clamping arms 35 to cause the pallet 5 to descend the distance 1 until the pallet 5 is clamped in position on the jig base 31. The positioning pin 9 is now released from the tool 4 and the tool support 8 is spaced downwardly from the tool 4. The unit 1 is then withdrawn away from the tool support 8, allowing the actuation rod 14 to return by the force of the spring 18. The clamp arm 10 is now angularly moved downwardly toward the clamping position. After the tool 4 has been transferred from the tool support 8 to the unit 1, the pallet 5 is lifted again by the actuation of the fluid cylinder 37, and then is transferred out of the machining station along the transfer bar 34.

The foregoing description has been directed to the tool change operation in which the tool 4 is inserted into the tool spindle 2. Prior to such tool change operation, a tool may be to be removed from the tool spindle 2 onto the tool support on another pallet which is of the same construction as that of the pallet 5. Such tool removal can be effected in an operation that is the reverse of the foregoing operation; the pallet is lowered prior to the advancing movement of the unit 1, and raised back when the unit 1 is fully advanced to receive the tool therefrom.

As described above, the clamp arm 10 is angularly movable up and down automatically in response to back-and-forth movement of the unit 1. However, a tool 4 is manually set on or removed from the tool support 8 at a tool change position outside the machining station. For such manual tool installation or removal operation, the knobs 22 are pushed back to release the lock pin 21 from the locking engagement with the upper surface of the clamp arm 10, and the handle 30 is turned to cause the cam body 28 to lift the vertical rod 27 for thereby angularly raising the clamp arm 10 until the same is held in the unclamping position by the cam body 28. Then the tool 4 can be removed from the tool support 8 or can be placed on the tool support 8.

Although a certain preferred embodiment has been shown and described in detail, it should be understood that many changes and modifications may be made therein without departing from the scope of the appended claims.

What is claimed is:

1. A tool changer comprising:
 a machining unit having a tool spindle for clamping a tool therein and including means for releasing said tool therefrom;
 a pallet movable toward a station in front of said machining unit;

support means on said pallet for releasably supporting the tool in substantial alignment with said tool spindle;

a feed actuator for displacing said machining unit toward and away from said support means to allow said tool spindle to receive the tool or release the same onto said support means;

means for displacing said pallet in a direction transverse to the direction in which said machining unit is displaceable so as to allow said support means to release the tool onto or receive the same from said tool spindle when said machining unit completes its displacement toward said support means; and a tool clamp mounted on said pallet for releasably clamping the tool on said support means, said tool clamp being mechanically responsive to the displacement of said machining unit toward said support means for releasing the tool on said support means wherein said tool clamp further comprises a clamp frame mounted on said pallet, a horizontally extending clamp arm vertically pivotably mounted on said clamp frame for releasably holding the tool on said support means, and a clamp actuation mechanism operatively mounted on said clamp frame and mechanically responsive to the displacement of said machining unit towards said support means for vertically moving said clamp arm to release the tool.

2. A tool changer according to claim 1, wherein said tool clamp further includes a spring acting between said pallet and said clamp arm for normally urging said clamp arm to hold the tool on said support means.

3. A tool changer according to claim 1, wherein said clamp arm has a cam surface, said clamp actuation mechanism comprising a guide bracket mounted on said clamp frame, an actuation rod axially slidably extending through said guide bracket, and an actuation pin mounted on said actuation rod and slidably engageable with said cam surface, said actuation rod being axially moved upon abutting engagement with said machining unit when the same is displaced toward said support means for causing said actuation pin to slidably engage said cam surface to release said clamp arm from clamping the tool.

4. A tool changer according to claim 3, wherein said clamp actuation mechanism further includes a spring for normally urging said actuation rod axially toward said machining unit.

5. A tool changer comprising:
a machining unit having a tool spindle for clamping a tool therein and including means for releasing said tool therefrom;

a pallet movable toward a station in front of said machining unit;

support means on said pallet for releasably supporting the tool in substantial alignment with said tool spindle;

a feed actuator for displacing said machining unit toward and away from said support means to allow said tool spindle to receive the tool or release the same onto said support means;

means for displacing said pallet in a direction transverse to the direction in which said machining unit is displaceable so as to allow said support means to release the tool onto or receive the same from said tool spindle when said machining unit completes its displacement toward said support means; and a tool clamp mounted on said pallet for releasably clamping the tool on said support means, said tool clamp being mechanically responsive to the displacement of said machining unit toward said support means for releasing the tool on said support means, wherein said tool clamp further comprises a clamp frame mounted on said pallet, a clamp arm pivotably mounted on said clamp frame for releasably holding the tool on said support means, and a clamp actuation mechanism operatively mounted on said clamp frame and mechanically responsive to the displacement of said machining unit towards said support means for vertically moving said clamp arm to release the tool;

wherein said clamp arm has a cam surface, said clamp actuation mechanism comprising a guide bracket mounted on said clamp frame, an actuation rod axially slidably extending through said guide bracket, and an actuation pin mounted on said actuation rod and slidably engageable with said cam surface, said actuation rod being axially moved upon abutting engagement with said machining unit when the same is displaced toward said support means for causing said actuation pin to slidably engage said cam surface to release said clamp arm from clamping the tool; and wherein said clamp actuation mechanism further includes a guide rod axially movable parallel to said actuation rod, and a lock pin slidably mounted on said guide rod and slidably engageable with said clamp arm, said guide rod being axially movable in unison with said actuation rod for causing said lock pin to disengage from said clamp arm prior to the sliding engagement of said actuation pin with said cam surface.

6. A tool changer according to claim 5, wherein said clamp actuation mechanism further includes a spring for normally urging said guide rod in a direction to engage said clamp arm.

7. A tool changer, comprising:
a machining unit having a tool spindle for clamping a tool therein and including means for releasing said tool therefrom;

a pallet movable toward a station in front of said machining unit;

support means on said pallet for releasably supporting the tool in substantial alignment with said tool spindle;

a feed actuator for displacing said machining unit toward and away from said support means to allow said tool spindle to receive the tool or release the same onto said support means;

means for displacing said pallet in a direction transverse to the direction in which said machining unit is displaceable so as to allow said support means to release the tool onto or receive the same from said tool spindle when said machining unit completes its displacement toward said support means;

a tool clamp mounted on said pallet for releasably clamping the tool on said support means, said tool clamp being mechanically responsive to the displacement of said machining unit toward said support means for releasing the tool on said support means, wherein said tool clamp further comprises a clamp frame mounted on said pallet, a clamp arm pivotably mounted on said clamp frame for releasably holding the tool on said support means, and a clamp actuation mechanism operatively mounted on said clamp frame and mechanically responsive to the displacement of said machining unit towards said support means for vertically moving said clamp arm to release the tool; and a manual actuation unit mounted on said clamp frame and comprising a rod having one end operatively engaging said clamp arm, a cam body angularly movably mounted on said clamp frame and pivotably coupled to the other end of said rod, said cam body having two cam surfaces selectively engageable with said clamp frame to keep said cam body at two different angularly spaced positions one at a time, and a handle fixed to said cam body for angularly moving said cam body, said rod being axially movable to release said clamp arm from clamping the tool when said cam body is brought from one of said two different angularly spaced positions to the other.

8. A tool changer according to claim 7, wherein said manual actuation unit further includes a stop mounted on said clamp frame for preventing said rod from being rotated about its own axis.

* * * * *